United States Patent [19]

Chattopadhyay

[11] Patent Number: 5,240,524
[45] Date of Patent: Aug. 31, 1993

[54] AMMONIUM NITRATE DENSITY MODIFICATION

[75] Inventor: Arun Chattopadhyay, Brossard, Canada

[73] Assignee: ICI Canada Inc., Ontario, Canada

[21] Appl. No.: 876,320

[22] Filed: Apr. 30, 1992

[30] Foreign Application Priority Data

Apr. 30, 1991 [GB] United Kingdom ............... 9109257
Jul. 19, 1991 [GB] United Kingdom ............... 9115681

[51] Int. Cl.⁵ ............................................ C06B 31/28
[52] U.S. Cl. ............................. 149/46; 264/3.1; 264/3.5; 264/3.6
[58] Field of Search ................. 264/3.1, 3.5, 3.6; 149/46

[56] References Cited

U.S. PATENT DOCUMENTS

| | | | |
|---|---|---|---|
| 3,103,457 | 9/1963 | Grossmann | 149/46 |
| 3,781,180 | 12/1973 | Harrison et al. | 149/21 |
| 3,830,672 | 8/1974 | Lista | 149/7 |
| 3,966,853 | 6/1976 | Osako | 149/46 |
| 4,124,368 | 11/1978 | Boyars | 149/2 |
| 4,698,106 | 10/1987 | Sayles | 149/76 |
| 4,836,268 | 6/1989 | Devendra | 164/132 |
| 4,960,475 | 10/1990 | Cranney et al. | 149/46 |
| 5,078,813 | 1/1992 | Tucker et al. | 149/7 |

FOREIGN PATENT DOCUMENTS 2609646 7/1988 France .

*Primary Examiner*—Donald P. Walsh
*Assistant Examiner*—Anthony R. Chi
*Attorney, Agent, or Firm*—Cushman, Darby & Cushman

[57] ABSTRACT

High density ammonium nitrate particles, e.g. prills are treated to reduce the density thereof by contact with a liquid medium which penetrates into the particles via pre-existing pathways, dissolves ammonium nitrate at the surfaces of the pathways and produces a gassing reaction by virtue of the presence of a chemical gassing agent or by a reaction with the ammonium nitrate whereby a portion of the ammonium nitrate particle is depleted by dissolution or gas losses during reaction, the gassing action facilitating venting of liquid from the particles and drying thereof to yield a particle of higher porosity.

19 Claims, No Drawings

AMMONIUM NITRATE DENSITY MODIFICATION

FIELD OF THE INVENTION

This invention relates to explosive compositions, and in particular to a method of modification of the ammonium nitrate particles used in the preparation of the explosive compositions.

DESCRIPTION OF THE RELATED ART

Ammonium nitrate is widely used in the explosive industry to prepare explosive compositions such as ANFO (Ammonium nitrate / Fuel Oil). To prepare a typical ANFO explosive, ammonium nitrate (94% by weight) is mixed with a fuel oil (6% by weight). The oil is absorbed by the ammonium nitrate particle to produce a free-flowing particulate mixture which can be detonated.

Other additives may be added to this mixture in order to modify the properties of the ANFO explosive, such as guar gums and polyisobutylene, to improve water resistance. The ammonium nitrate particles may also be mixed with emulsion explosives to form AN-emulsion blends, such as for example, heavy ANFO blasting agents.

Commercial grades of ammonium nitrate are available having a variety of densities. However, to be of commercial use in the production of ANFO type, or AN-emulsion blend, explosives, the ammonium nitrate particles preferably have a free-pour density of less than 0.95 g/cc. particles with this density are more porous than particles having a higher density, and thus are able to absorb the fuel oil, from the ANFO mixture or from the emulsion explosive, more readily. This improved ability to absorb fuel oil is desirable in the production and use of ANFO type and AN-emulsion blend explosives.

The density of the solid ammonium nitrate particle is established when the solid particle is formed and there are no known industrial methods to easily modify the particle density once the particle has been formed. Thus, explosive grade ammonium nitrate, having the low density desirable for ANFO type or AN-emulsion blend explosive production may not be available, or may be expensive, even in areas where lower cost fertilizer grade ammonium nitrate, having a higher density, is available.

Thus, it would be desirable to provide a method of lowering the density of an ammonium nitrate particle, and thus also increase the porosity of the particle, in order to convert high density ammonium nitrate into an explosive grade ammonium nitrate particle.

Russo in U.S. Pat. No. 3,388,014 describes a method to produce explosive grade ammonium nitrate prills. However, the method of Russo requires prilling of a molten mixture of ammonium nitrate and a nucleating agent in a prilling tower, and subjecting the resultant prills to a plurality of heating and cooling cycles. Thus, while Russo is directed to a method of forming high porosity, and thus low density, ammonium nitrate prills, the process of Russo is capital intensive, and is best conducted by the prill manufacturer.

It is thus an object of the present invention to provide a simpler and more economical method of reducing the density of an existing ammonium nitrate particle.

SUMMARY OF THE INVENTION

Accordingly, the present invention provides methods of reducing the density of an ammonium nitrate particle by increasing its porosity which methods comprise contacting the particle with a liquid medium, which liquid medium penetrates into the interior portions of the particle by way of pre-existing pathways in the particles to provide a gassing reaction (gas-forming) within the pathways leading to enlargement of the pathways and subsequent flushing out of the liquid by the gas so formed. This may be achieved in a number of ways in that the liquid medium may be a passive carrier of a gassing agent or of a reagent which will cause a gas to be formed when brought into contact with the ammonium nitrate, or the liquid medium itself may initiate a gassing reaction by interacting with the ammonium nitrate.

The liquid medium may, for example, contain a gassing agent which agent will react with the ammonium nitrate to generate gas, or may contain a liquefied gas under pressure, or a pressurized gas dissolved in a liquid, both of which will gas as pressure is released.

Typically the pre-existing pathways comprise small cracks and fissures in the particle which are formed during production or handling of the ammonium nitrate particles. Thus it is preferred that the liquid medium is capable of acting as a solvent for ammonium nitrate, to thereby provide for enlargement of the pre-existing pathways by dissolution of the ammonium nitrate surfaces of the pathways and subsequent venting of the solute containing liquid by the gassing reaction developed within said enlarged pathways. Such venting conveniently avoids the possibility of recrystallisation of ammonium nitrate in the passageways.

Furthermore the ammonium nitrate depletion leading to enlargement of the passageways may be achieved not only by virtue of the liquid medium acting as a solvent for same but it also may be achieved as a result of a chemical reaction within the passageways. Such a reaction may occur between the ammonium nitrate and a gassing agent provided in the liquid to form a gas, said gas in either event driving out the liquid medium from the said passageways. It will be appreciated that the rapid gassing reaction will result in a degree of expansion stress within the ammonium nitrate prill particles contributing to opening internal fractures and crevices. Preferably, however, the ammonium nitrate is at least sparingly soluble in the liquid medium. From this it will be apparent that aqueous media are preferred.

Thus according to one aspect of the invention there is provided a method of reducing the density of an ammonium nitrate particle by increasing its porosity which method comprises:

contacting the particle with a liquid medium which liquid medium is a solvent for ammonium nitrate, and which liquid medium penetrates into the interior portions of the particle by way of pre-existing pathways in the particle;

dissolving the ammonium nitrate from the interior portions of the particle, into said liquid medium, to form enlarged pathways; and generating gas within the liquid medium so as to expel ammonium nitrate-containing liquid medium from the enlarged pathways.

Further according to this invention there is provided a method of reducing the density of an ammonium nitrate particle by increasing its porosity which method comprises:

contacting said ammonium nitrate particle with a solution of a chemical gassing agent;

allowing the gassing agent solution to penetrate into the ammonium nitrate particle and dissolve a portion of said ammonium nitrate particle; and causing the gassing agent to gas.

Chemical gassing agents are well known within the slurry and emulsion explosive industries and are typically used to chemically generate gas bubbles to act as voids in the emulsion explosive, and thus sensitize the explosive. Typical chemical gassing agents include a wide variety of gas-generating materials known in the art. These include the nitrogen-releasing blowing agents such as N,N'-di-nitrosopentamethylenetetramine; N,N'-dimethyl , and N,N'-diethyl-N,N'-dinitrosoterephthalamide; benzenesulfonyl-hydrazide; azobisisobutyronitrile; and p-tert-butyl-benzazide; as well as alkali metal borohydrides; dual-component hydrazine systems such as hydrazine and hydrazine derivatives and an oxidizing agent therefor such as hydrogen peroxide, or a permanganate, dichromate, hypochlorite, iodate, or periodate; and dual component hydrogen peroxide systems such as hydrogen peroxide in conjunction with a compound that oxidizes or catalyses the decomposition of hydrogen peroxide such as a permanganate, dichromate, or hypochlorite, manganese dioxide, a source of manganous ion, or a source of cupric ion; and alkali metal or ammonium carbonates, bicarbonates, or nitrites, optionally in conjunction with an acid.

Preferably, the gassing agent is a nitrite, and more preferably an alkali metal nitrite, and most preferably, sodium nitrite. Chemical gassing in compositions comprising nitrites is generally achieved by reacting the nitrite with an ammonium ion in order to produce nitrogen gas.

Reaction, or gassing, of the gassing agent can be effected by, as in the case of sodium nitrite, mixing the gassing agent with a second chemical. However, gassing could also be initiated, or the gassing reaction rate controlled, by adjusting the temperature of the system, or by adding a chemical gassing agent catalyst to the particle or to the solution. Such catalysts are known within the explosives industry.

Chemical gassing by nitrite gassing agents may be accelerated, for example, by lowering the pH of the gassing solution, preferably to a pH of less than 7 by addition of an acid. Preferably, the pH is lowered to between 1 and 5, and more preferably between 2 and 4 since oxides of nitrogen may be formed at a pH of less than 2. Suitable acids include for example, sulphuric and nitric acids, but other acids will be apparent to one skilled in the art.

Accordingly, the present invention also provides a method of reducing the density of an ammonium nitrate particle as described hereinabove, wherein the gassing agent solution comprises an acidic aqueous solution of sodium nitrite having a pH of between 2 and 4.

Whilst not wishing to be bound by theory, it is believed that the solution, or liquid medium, containing the gassing agent first penetrates the ammonium nitrate particle through the various cracks and fissures in the particle, and dissolves a portion of the ammonium nitrate. When gassing occurs, gas-containing voids and fissures are created and/or enlarged within the structure of the particle, and thus lower the density, and increase the porosity of the particles. These voids are produced by ammonium nitrate dissolution and/or reaction of the ammonium ion with the nitrite. The gassing reaction expels the remaining solution from the void by the force of the gas pressure from the gas formed. The porosity of the particle is thus, also increased since fuel oil may subsequently be absorbed into the enlarged fissures and voids formed in the particle. The effects of warming the prills in a stream of warm air to a temperature of say around 35 C. after nitrite solution treatment so as to facilitate the gassing reaction, improve expression of liquid phase from the pore structure, and after drying of the prills are shown in Examples 6, 7 and 9 hereinafter.

While reference is made throughout this specification to effecting a reduction in density, it is apparent to one skilled in the art, that the purpose of the density reduction is to effect an increase in the porosity of the particle, and thus permit an increased amount of fuel oil to be absorbed by the ammonium nitrate particles. Accordingly, the porosity of the particle is increased, and the density of the particle is reduced, to a degree wherein the particle can be used in the commercial production of ANFO type, or AN-emulsion blend explosive. Thus, the present invention allows the density of ammonium nitrate particles to be reduced from greater than 0.90 g/cc to less than 0.90 g/cc, as measured as a free-pour density. More preferably the method of the present invention lowers the density of the ammonium nitrate particle from a density of greater than about 0.95 g/cc to a density of less than about 0.85 g/cc, and most preferably to a density of between 0.75 g/cc and 0.85 g/cc.

Further, the method of the present invention may also be used to lower the density of particles which may already have a sufficiently low density to be acceptable as explosive grade ammonium nitrate particles. Thus, the present invention provides a method wherein the density of an ammonium nitrate particle is reduced, for example from 0.85 to 0.75. Accordingly, the present invention provides a method wherein the density of an ammonium nitrate particle is reduced by more than 0.1 g/cc, measured as free-pour density.

The effect of the density reduction achieved by the method of the present invention may also be measured on individual particles by, for example, mercury pyknometry. The density of the individual particles is preferably reduced from greater than 1.55 g/cc to less than 1.44 g/cc.

The ammonium nitrate is preferably used in the form of an ammonium nitrate prill. When the density of prills of, for example, fertilizer grade ammonium nitrate has been reduced in accordance with the method of the present invention, a more porous ammonium nitrate prill is produced which has similar physical properties, such as friability and porosity, and chemical characteristics to typical explosives grade, porous ammonium nitrate prills which are commercially available.

The oil absorbency of typical untreated particles, and preferably prills, is less than 1%. Preferably, after treatment with a method in accordance with the present invention, however, the oil absorbency of the particles has increased to a value greater than 4%, and more preferably to a value greater than 5%.

In the practice of the present invention, water is a preferred liquid medium, which will dissolve the ammonium nitrate, and into which a gassing agent can be dissolved. The amount of solvent, or more particularly, water, used is preferably only that amount needed to wet the particles without unnecessary dissolution of the particle. Typically, application of 1% by weight of a 20% aqueous solution of sodium nitrite is sufficient to effect density reduction in ammonium nitrate prills. The level of nitrite used is dependent on the degree of porosity increase, and thus the density decrease, desired, and the process conditions used. Typically the application of 0.1 to 0.5% sodium nitrite, expressed as a dry weight basis, is sufficient to give the desired properties for explosive use.

After the gassing reaction has taken place, the water content of the particles can be reduced in a subsequent drying stage wherein the water content is preferably lowered to less than 0.2% by weight.

In order to lower the surface tension of the aqueous sodium nitrite solution, and thus improve the speed of penetration of the solution into the ammonium nitrate particles or prills, a surfactant, or a mixture of co-surfactants, can be optionally added to the sodium nitrite solution. Preferred surfactants for an aqueous sodium nitrite system are water soluble surfactants and include, for example, sodium lauryl sulphate, amphoteric ethoxylated amines, and the like.

The chemical gassing agent can also be added to the ammonium nitrate particle as a water-in-oil emulsion or microemulsion having a discontinuous gassing agent. containing, and preferably, sodium nitrite-containing-aqueous phase, and a continuous oil phase.

The oil phase present in the emulsion or microemulsion can also contribute to the fuel oil phase to be added in the production of an ANFO type, or AN-emulsion blend, explosive. When sodium nitrite is used, the nitrite present in the aqueous discontinuous phase will react with ammonium ions, from the ammonium nitrate, present at the aqueous liquid interface once the emulsion has been absorbed by the particle or prill.

The gassing agent emulsion needs only to be sufficiently stable for the time required to add the emulsion to the ammonium nitrate. However, the emulsion is preferably stabilized so that it may be stored, by the addition of suitable surfactants. These surfactants include those surfactants typically used for the preparation of microemulsions, such as for example, cetyl trimethyl ammonium bromide, cetyl dimethyl ammonium chloride, phenyl stearyl ammonium chloride, or sodium di-2-ethyl hexyl sulfosulfinate, in combination with a co-surfactant such as butanol, pentanol, hexanol, or cyclohexanol, and the like.

It should be noted that transportation of ammonium nitrate having organic material levels of greater than, for example 0.2% of the total product, may be restricted due to a possible explosive hazard. Accordingly, the level of surfactants and/or oil phase used to improve wetting, or to form an emulsion, should preferably be controlled so that the modified ammonium nitrate particle can be transported without restriction.

In a further aspect, the present invention also provides an ammonium nitrate particle having a reduced density, wherein the density of the particle has been reduced by increasing its porosity by a method as described hereinabove.

In a still further aspect, the present invention also provides an ANFO type explosive, comprising ammonium nitrate particles and a fuel oil, wherein the density of the ammonium nitrate particles has been reduced by increasing their porosity by a method as described hereinabove.

In a yet still further aspect, the present invention also provides an AN-emulsion blend explosive, comprising ammonium nitrate particles and an emulsion explosive, wherein the density of the ammonium nitrate particles has been reduced by increasing their porosity by a method as described hereinabove.

ANFO type, and AN-emulsion blend explosives are well known within the explosives industry, and can be prepared according to the methods of the prior art.

DESCRIPTION OF PREFERRED EMBODIMENTS

The invention will now be described by way of example only, with reference to the following examples.

EXAMPLE 1

A 100 gram sample of high density, fertilizer grade ammonium nitrate prills having a free-pour density of 0.95 g/cc was treated with 1 ml. of a 20% solution of sodium nitrite. The sodium nitrite solution contained 1% by weight of a sodium lauryl sulphate surfactant. The mixture was mixed, and then heated in a stream of air for 10 minutes at 40° C. After completion of the mixing and heating, the treated prills appeared dry and had a free-pour density of the ammonium nitrate of 0.84 g/cc.

EXAMPLE 2

A water-in-oil microemulsion of an acidic sodium nitrite solution, having a pH of about 2, as an internal phase, and fuel oil as the continuous phase was prepared. The sodium nitrite solution contained 20% sodium nitrite, and sufficient nitric acid to achieve the stated pH value. The aqueous solution was dispersed into the fuel phase by mixing in a high shear mixer. The dispersed phase volume of the aqueous solution in the emulsion was 30%.

Two milliters of the microemulsion was mixed into 100 grams of high density ammonium nitrate prills. After mixing, the particles were heated in a stream of air for 10 minutes at 40° C. After this treatment, the prills appeared dry, and the free-pour density of the prills had decreased from 0.95 to 0.85 g/cc.

EXAMPLE 3

An emulsion of a 20% aqueous sodium nitrite solution was prepared in a manner similar to the method described for the microemulsion of Example 2. However, the aqueous phase was increased to 60% with a 40% oil phase.

One milliliter of the emulsion was mixed with 100 grams of high density ammonium nitrate and subsequently heated in a stream of air for 10 minutes at 40° C. The resultant ammonium nitrate prills appeared dry, and had been reduced in density from 0.95 g/cc to 0.84 g/cc.

EXAMPLE 4

The oil absorbency of various ammonium nitrate samples was measured according to the following procedure. A 100 gram sample of the ammonium nitrate to be tested was mixed for 5 minutes with 6 grams of fuel oil. After mixing, any excess, non-absorbed oil was blotted from the ammonium nitrate particle. The final weight of ammonium nitrate and oil was measured in order to determine the amount of oil, as a percentage of the weight of ammonium nitrate, that had been absorbed.

The oil absorbency of the untreated, high density ammonium nitrate prill used in Examples 1 to 3 was measured as 0.8%. The oil absorbency of the treated ammonium nitrate prill from Example 1 was measured as 5.68%.

This large increase in the oil absorbency of the ammonium nitrate particle demonstrates the significant increase in the porosity of the ammonium nitrate particle after treatment according to the present invention. Accordingly, the present invention provides a method to customize the density, porosity, and oil absorbency of the ammonium nitrate particles used in the production of ANFO type and AN-emulsion blend explosives.

EXAMPLE 5

The explosive properties of a variety of ANFO type explosives was measured by producing ANFO explosives having various ammonium nitrate prills. The explosive properties of the ANFO products is set out in Table 1. Mixtures 1, 2 and 3 were prepared using ammonium nitrate prills which had not been treated according to the present invention. Mixture 1 comprises a conventional explosive grade ammonium nitrate prill, and is used as a standard for comparison purposes. Mixtures 2 and 3 which contained the high density ammonium nitrate, were not initiated in the test of explosive properties. Mixture 3 was prepared by treating high density ammonium nitrate prills with 1% water by weight and subsequently heating in a stream of air for 10 minutes at 40° C. Although some reduction in density is observed, combined with an increase in oil absorbency, the ANFO containing the prill was not detonable. It is believed that the water merely dissolved the surface of the ammonium nitrate prill, and that re-crystallization of the ammonium nitrate resulted in a lower density. However, by recrystallization of the surface of the prill, the ammonium nitrate could not be used to prepare a typical ANFO type explosive.

Mixtures 4 to 6 were prepared in accordance with the present invention, which included a gassing agent, and were all successfully initiated in the test as shown in the column of explosive properties. All of mixtures 4 to 6 had velocity of detonation (VOD) values similar to Mixture 1 which contained conventional explosive grade ammonium nitrate prills.

Accordingly, it is demonstrated that explosive grade ammonium nitrate can be produced from fertilizer grade material by the method of the present invention.

TABLE 1

| Mixture No. | Free-pour Density (q/cc) | % fuel oil absorbed in ANFO | Initiator in 75 mm diameter | Velocity of Detn. (km/sec) |
|---|---|---|---|---|
| 1 | 0.83 | 7.4 | Pentomex* | 2.1 |
| 2 | 0.95 | 0.8 | Failed | — |
| 3 | 0.85 | 3.6 | Failed | — |
| 4 | 0.84 | 5.68 | Pentomex | 2.0 |
| 5 | 0.85 | 4.85 | Pentomex | 1.9 |
| 6 | 0.84 | 5.0 | Pentomex | 1.9 |

Mixture No.:
1 Explosive grade low density ammonium nitrate.
2 Fertilizer grade high density ammonium nitrate.
3 Fertilizer grade high density ammonium nitrate treated with 1% water.
4 Ammonium nitrate prill treated as described in Example 1.
5 Ammonium nitrate prill treated as described in Example 2.
6 Ammonium nitrate prill treated as described in Example 3.
*Trade Mark for an explosive booster made from TNT and PETN The following examples 6, 7 and 9 are in accordance with the invention whilst example 8 is a comparative example.

EXAMPLE 6

A 100 g sample of high density, fertilizer grade AN granules commercially known as FERTIMEX (ex ICI Mexico) was treated with 1 ml of 20% $NaNO_2$ solution of pH 2 and dried in a hot stream of air for 10 min.

After completion of mixing and drying, the oil absorbency of the FERTIMEX granules was measured as in Example 4. The oil absorbency of such granules was found to increase from 0.3% (for untreated granules) to 6.1%.

EXAMPLE 7

(i) A 20 kg sample of high density fertilizer grade prills (ex Lambton) was taken in an agitator bowl (smaller version of a concrete mixer). 300 gms of 20% $NaNO_2$ solution (pH 2) was added to the prills by means of a sprayer over 5 min.

After the addition of the nitrite solution the prills were dried by a hot stream of air. During the drying process the prill temperature rose to 350 C.

After the prills appeared dry the free-pour density and absorbency were recorded as 0.84 g/cc & 4.2% respectively. Then 1200 gms of fuel oil was mixed with the treated prills in the agitator bowl and packed in a 1 inch (2.54 cm) diameter plastic shell of length 4 ft (1.2 m.). The ANFO made with such treated FGAN detonated reliably with a 'Procor' booster and the velocity of detonation was in the region of 4 km/sec.

(ii) The procedure of (i) was repeated except that after the addition of nitrite solution the prills were kept in a box without going through the drying procedure. The prills were left under such condition for 10 days. After 10 days the free-pour density and oil absorbency were recorded as 0.88 g/cc and 1.6% respectively. About 1200 gms of fuel oil was then mixed with such treated prills and cartridged and detonated in a similar manner as mentioned in (i) above. The velocity of detonation was in the region of 2 km/sec.

Example 8

Examples 7(i) & 7(ii) were repeated with FGAN prills (ex Lambton) but the prills were treated with an equivalent amount of water instead of nitrite solution.
8(i) The test method was similar to that used in Example 7(i).

The free-pour density and oil absorbency were recorded as 0.86 g/cc & 2.8% respectively. The velocity of detonation was around 2500 m/sec.

8(ii) The test method was similar to that used in Example 7(ii).

The free-pour density and oil absorbency were recorded as 0.89 g/cc and 0.73% respectively. The ANFO so prepared failed to detonate.

The above Examples 6, 7 and 8 demonstrate the beneficial effect of a certain amount of heating in order to effectively expel the water molecules from within the prill pores and create a particle with acceptable absorption characteristics. It should be noted however that material that detonates with a significantly lower VOD can be generated without recourse to the use of forced drying.

The differences in performance between ANFO made from nitrite solution treated prills and water treated prills is also shown.

EXAMPLE 9

(i) A 100 g sample of Lambton prills was treated with 1.4 g of acidic nitrite solution according to the procedure of Example 6. After the completion of mixing the prills were transferred to a SS sieve and the prills were allowed to dry in an ambient condition (200 C.) with a slow stream of air. After the prills appeared dry the free-pour density, prill density and oil absorbency were measured. The experiment was repeated five times and oil absorbency was found to vary between 1.6-3.8% without any noticeable change in free-pour density (0.85-0.87 g/cc), whereas the prill density was found to vary between 1.40-1.46 g/cc.

(ii) Following the similar test method as 9(i) while using equivalent amount of water instead of nitrite solution, the oil absorbency was found to vary between 0.8-1.2% and the prill density was found to vary between 1.51-1.48 g;cc.

These data demonstrate that nitrite solution is acting as a pore forming agent and thereby increases the oil absorbency more efficiently than water treatment alone.

Having described specific embodiments of the present invention, it is not to be considered thereby that these illustrative examples represent the only ways of carrying out the invention in that variations thereof will occur to those skilled in this art so that due attention should be paid to the appended claims which define the monopoly.

What I claim is:

1. A method of reducing the density of an ammonium nitrate particle by increasing a porosity therein which method comprises the steps of:
    contracting said particle with a liquid medium and allowing said medium to penetrate into an interior portion of said particle by way of a pre-existing pathway in said particle, said medium comprising means for producing a gas other than water vapor, whereby ammonium nitrate at a surface of said pathway is dissolved and said gas produced which facilitates pathway enlargement and subsequent venting of liquid from said pathway.

2. The method claimed in claim 1, wherein said gas producing means is a chemical gassing agent.

3. The method claimed in claim 1, wherein said gas producing means is a liquefied gas under pressure.

4. The method claimed in claim 1, wherein said gas producing means is a pressurized gas dissolved in a liquid.

5. The method claimed in claim 1, wherein said liquid medium is an aqueous solution.

6. The method claimed in claim 2, wherein said chemical gassing agent is an alkali metal nitrite.

7. The method claimed in claim 6, wherein said alkali metal nitrite is sodium nitrite.

8. The method claimed in claim 5, wherein said solution additionally comprises a water soluble surfactant.

9. The method claimed in claim 5, wherein said solution has a pH in a range of from about 2 to about 4.

10. The method claimed in claim 1, additionally comprising the step of drying said particle to a moisture content of less than about 0.2% weight.

11. The method claimed in claim 1, wherein said ammonium nitrate particle is a prill.

12. The method claimed in claim 11, wherein a free-pour density of said ammonium nitrate prill is reduced from greater than about 0.90 g/cc to less than about 0.90 g. cc.

13. The method claimed in claim 11, wherein a mercury pycnometry density of an individual prill is reduced from greater than about 1.55 g/cc to less than about 1.44 g/cc.

14. The method claimed in claim 2, wherein said medium comprising said chemical gassing agent is a water-in-oil emulsion having a discontinuous sodium nitrite-containing aqueous phase, and a continuous oil phase.

15. The method claimed in claim 14, wherein said emulsion additionally comprises a surfactant to stabilize said emulsion.

16. The method claimed in claim 5, wherein an oil absorbency of said ammonium nitrate particle is increased to greater than about 4%.

17. An ammonium nitrate particle having a reduced density, wherein a density of said particle has been reduced by increasing a porosity therein by the method claimed in claim 1.

18. An ANFO type explosive, comprising an ammonium nitrate particle and a fuel oil, wherein a density of said ammonium nitrate particle has been reduced by increasing a porosity therein by the method claimed in claim 1.

19. An AN-emulsion blend explosive, comprising an ammonium nitrate particle and an emulsion explosive, wherein a density of said ammonium nitrate particle has been reduced by increasing a porosity therein by the method claimed in claim 1.

* * * * *